(12) United States Patent
Zhang et al.

(10) Patent No.: US 12,215,049 B2
(45) Date of Patent: Feb. 4, 2025

(54) COVER PLATE STRUCTURE FOR GLASS FIBER TANK FURNACE FOREHEARTH

(71) Applicant: JUSHI GROUP CO., LTD., Tongxiang (CN)

(72) Inventors: Yuqiang Zhang, Tongxiang (CN); Changying Fang, Tongxiang (CN); Xianliang Zhao, Tongxiang (CN); Yucang Yan, Tongxiang (CN); Xiaodong Weng, Tongxiang (CN)

(73) Assignee: JUSHI GROUP CO., LTD., Tongxiang (CN)

( * ) Notice: Subject to any disclaimer, the term of this patent is extended or adjusted under 35 U.S.C. 154(b) by 714 days.

(21) Appl. No.: 17/425,542

(22) PCT Filed: Aug. 12, 2020

(86) PCT No.: PCT/CN2020/108656
§ 371 (c)(1),
(2) Date: Jul. 23, 2021

(87) PCT Pub. No.: WO2021/027839
PCT Pub. Date: Feb. 18, 2021

(65) Prior Publication Data
US 2022/0098079 A1 Mar. 31, 2022

(30) Foreign Application Priority Data
Aug. 13, 2019 (CN) .......................... 201910743118.6

(51) Int. Cl.
*C03B 5/43* (2006.01)
*C03B 5/04* (2006.01)
(Continued)

(52) U.S. Cl.
CPC .................. *C03B 5/43* (2013.01); *C03B 5/04* (2013.01); *C03B 7/02* (2013.01); *F27D 1/0043* (2013.01); *F27D 1/025* (2013.01)

(58) Field of Classification Search
CPC .... C03B 5/43; C03B 5/04; C03B 5/42; C03B 7/02; F27D 1/0043; F27D 1/025
(Continued)

(56) References Cited

U.S. PATENT DOCUMENTS 2,753,711 A * 7/1956 Weber ..................... F27D 1/025
432/252
3,624,733 A * 11/1971 Eadie ........................ C03B 5/42
110/335

FOREIGN PATENT DOCUMENTS

CN 201901635 U 7/2011
CN 202186938 U 4/2012
(Continued)

OTHER PUBLICATIONS

Japan Patent Office The Office Action for Application No. JP2021-540453 Jul. 26, 2021 8 pages (with translation).
(Continued)

*Primary Examiner* — Steven B McAllister
*Assistant Examiner* — Charles R Brawner
(74) *Attorney, Agent, or Firm* — ANOVA LAW GROUP, PLLC

(57) ABSTRACT

A cover plate structure for a glass fiber tank furnace forehearth includes chest wall bricks at two sides of the forehearth, cover plate bricks each spanning between a top end of at least one of the chest wall bricks at one of the two sides of the forehearth and a top end of at least one of the chest wall bricks at another one of the two sides of the forehearth, a thermal insulation layer covering outer surfaces of the cover plate bricks and the chest wall bricks, and a gap-
(Continued)

covering brick fixed between the cover plate bricks and the thermal insulation layer and covering a gap between adjacent ones of the cover plate bricks.

7 Claims, 6 Drawing Sheets

(51) Int. Cl.
 *C03B 7/02* (2006.01)
 *F27D 1/00* (2006.01)
 *F27D 1/02* (2006.01)

(58) Field of Classification Search
 USPC .......................................................... 432/247
 See application file for complete search history.

(56) References Cited

FOREIGN PATENT DOCUMENTS

| | | | |
|---|---|---|---|
| CN | 202265495 U | | 6/2012 |
| CN | 103058495 A | * | 4/2013 |
| CN | 203128390 U | | 8/2013 |
| CN | 203683353 U | * | 7/2014 |
| CN | 104034164 A | | 9/2014 |
| CN | 208485791 U | | 2/2019 |
| CN | 209098496 U | | 7/2019 |
| CN | 110342783 A | | 10/2019 |
| CN | 210560054 U | | 5/2020 |
| GB | 384295 A | | 12/1932 |
| JP | S54025263 U | | 2/1979 |
| WO | WO-0208128 A1 * | 1/2002 | ............... C03B 5/42 |
| WO | 2014018838 A2 | | 1/2014 |

OTHER PUBLICATIONS

The China National Intellectual Property Administration (CNIPA) First Office Action for CN Application No. 201910743118.6 Nov. 2, 2023 12 Pages (Including English translation).

Intellectual Property India Hearing Notice for Application No. 202127030036 Oct. 30, 2023 2 pages.

Egyptian Patent Office The Office Action for Application No. 2021071140 Jul. 4, 2023 7 pages (with translation).

The European Patent Office (EPO) Supplementary Search Report for EP Application No. 20853506.2 Jul. 17, 2023 7 Pages.

The World Intellectual Property Organization (WIPO) International Search Report for PCT/CN2020/108656 Oct. 28, 2020 8 Pages (including translation).

* cited by examiner

COVER PLATE STRUCTURE FOR GLASS FIBER TANK FURNACE FOREHEARTH

CROSS-REFERENCE TO RELATED APPLICATIONS

The present application is a national stage entry under 35 U.S.C. §371 of International Application No. PCT/CN 2020/108656, filed on Aug. 12, 2020, which claims priority to Chinese Patent Application No. 201910743118.6, filed on Aug. 13, 2019 and entitled "Cover Plate Structure for Glass Fiber Tank Furnace Forehearth," the disclosures of both of which are incorporated herein by reference in their entireties.

TECHNICAL FIELD

The present application relates to the field of glass fiber production equipment and technology, and in particular, to a cover plate structure for glass fiber tank furnace forehearth.

BACKGROUND

The upper structure of a glass fiber tank furnace forehearth comprises chest wall bricks on the two sides of the glass fiber tank furnace forehearth, and cover plate brick and a thermal insulation layer at the top of the upper structure. Conventionally, a cover plate structure of the upper structure of a glass fiber tank furnace forehearth includes cover plate bricks and a thermal insulation layer being laid thereon. Prior to the start of operation, the glass fiber tank furnace needs to be heated up. During the heating process, the cover plate bricks will expand and move, resulting in the loose sealing between adjacent cover plate bricks. After the tank furnace is put into operation, the flame in the forehearth will rush out through a gap between adjacent cover plate bricks and burn through the thermal insulation layer, thus causing a phenomenon of "darting flame." Such phenomenon would severely affect the operation safety and service life of the furnace, and may even cause safety accidents.

SUMMARY

The present application addresses the issue described above. The purpose of the application is to provide a cover plate structure for glass fiber tank furnace forehearth to solve the above technical problems. Specifically, the present application provides a cover plate structure for glass fiber tank furnace forehearth that can prevent the flame from rushing out through the gaps between adjacent cover plate bricks.

The cover plate structure for glass fiber tank furnace forehearth according to the present application comprises a chest wall brick, a cover plate brick and a thermal insulation layer, wherein the chest wall brick is built on each of the two sides of the forehearth, the cover plate brick spans the top ends of the chest wall brick, and the thermal insulation layer covers the outer surfaces of the cover plate brick and the chest wall brick. The cover plate structure further comprises a first layer gap-covering brick, which is fixed between the cover plate brick and the thermal insulation layer and covers the gap between adjacent cover plate bricks.

Wherein, the top of the first layer gap-covering brick is aligned with the top of the cover plate brick.

Wherein, the section of the cover plate brick is convex, and the section of the first layer gap-covering brick is rectangular.

Wherein, a first groove is arranged between the edge and the top of the cover plate brick, a second groove is arranged at the bottom of the first layer gap-covering brick, and the side wall of the first layer gap-covering brick is embedded in the first groove.

Wherein, the depth of the first groove is greater than or equal to the depth of the second groove.

Wherein, the height difference between the edge and the top of the cover plate brick is greater than or equal to the difference between the thickness of the first layer gap-covering brick and the depth of the second groove. Preferably, the height difference between the edge and the top of the cover plate brick is equal to the difference between the thickness of the first layer gap-covering brick and the depth of the second groove.

Wherein, the thickness of the side wall of the first layer gap-covering brick is equal to or less than the width of the first groove, and the width of the second groove is greater than or equal to twice the width of the edge of the cover plate brick.

Wherein, the material of the first layer gap-covering brick is the same as that of the cover plate brick, and the material is resintered mullite, zircon or sintered AZS30.

Wherein, the cover plate structure further comprises a second layer gap-covering brick. The second layer gap-covering brick is fixed between the first layer gap-covering brick and the thermal insulation layer, and covers the gap between adjacent first layer gap-covering bricks.

The beneficial effects of the present application include:

The structure of the cover plate brick is improved and structurally matching gap-covering bricks are provided to cover the gaps between adjacent cover plate bricks, so that the flame inside the glass fiber tank furnace forehearth can be effectively prevented from rushing out through the gaps between adjacent cover plate bricks. At the same time, the connection stability of cover plate bricks is also ensured, and thus the stability and service life of the cover plate structure for tank furnace forehearth is guaranteed.

BRIEF DESCRIPTION OF THE DRAWINGS

The drawings incorporated in the description and constituting a part of the description show the embodiments of the present application, and are used for explaining the principle of the present application in combination with the description. In these drawings, similar reference numerals represent similar elements. The drawings described hereinafter are some of but not all of the embodiments of the present application. A person of ordinary skill in the art can obtain other drawings based on these drawings without paying any creative effort.

DETAILED DESCRIPTION OF THE EMBODIMENTS

To make the objectives, technical solutions and advantages of the embodiments of the present application clearer, the technical solutions in the embodiments of the present application will be described clearly and completely with reference to the accompanying drawings in the embodiments of the present application. Apparently, the described embodiments are just some of but not all of the embodiments of the present application. All other embodiments obtained by a person of ordinary skill in the art based on the embodiments of the present application without paying any creative effort shall fall into the protection scope of the present application. It is to be noted that the embodiments in the present application and the features in the embodiments can be combined at will if not conflicted.

The present application improves on the edge structure of the cover plate brick and arranges a gap-covering brick at the gap between adjacent cover plate bricks so as to cover the gap, so that the flame inside the glass fiber tank furnace forehearth can be effectively prevented from rushing out through the gap. At the same time, the gap-covering brick is structurally matched with the cover plate brick to ensure connection stability of the adjacent cover plate bricks, and thus the stability and service life of the cover plate structure for tank furnace forehearth is guaranteed.

The cover plate structure for glass fiber tank furnace forehearth according to the present application is described below in detail with reference to the accompanying drawings.

Figure 1:
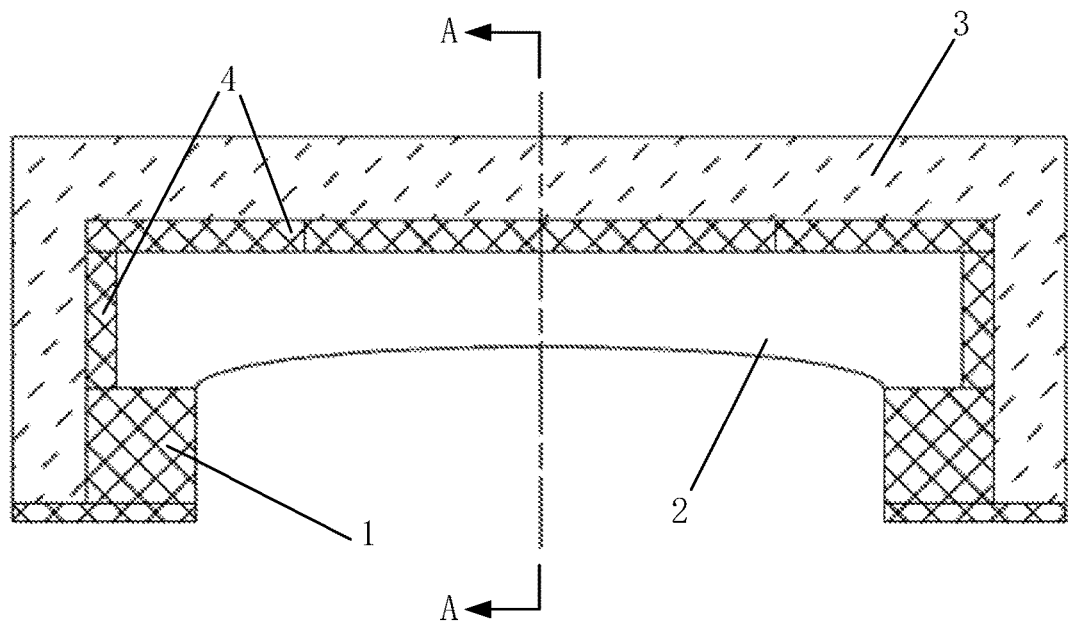
FIG. 1 is a schematic diagram of a cover plate structure for glass fiber tank furnace forehearth according to the present application.
Figure 2:
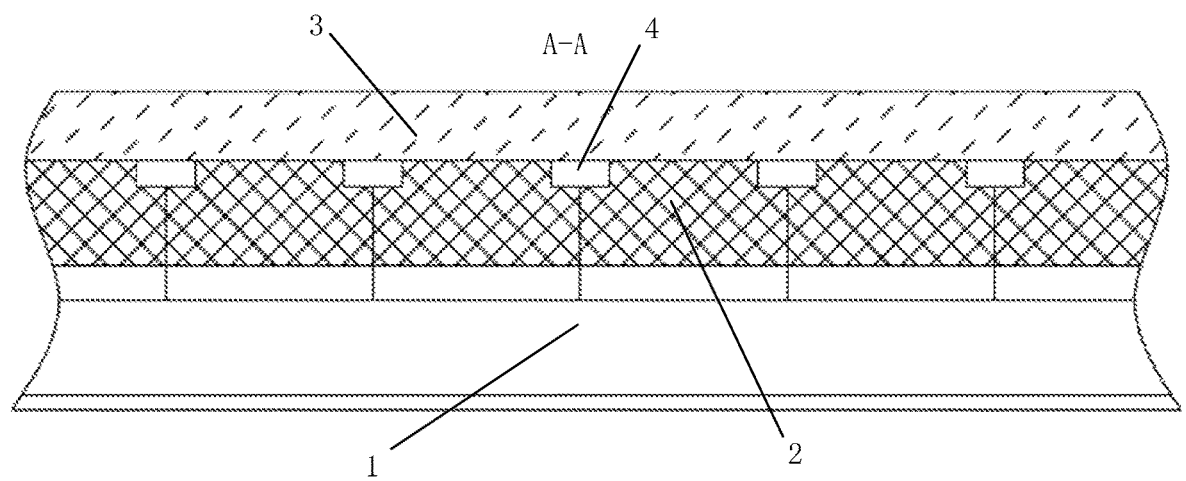
FIG. 2 is an A-A sectional view of FIG. 1.

FIG. 1 shows a schematic diagram of a cover plate structure for glass fiber tank furnace forehearth in an embodiment of the present application. FIG. 2 is an A-A sectional view of the cover plate structure as shown in FIG. 1. As illustrated in FIG. 1 and FIG. 2, the cover plate structure for glass fiber tank furnace forehearth according to the present application comprises a chest wall brick 1, a cover plate brick 2 and a thermal insulation layer 3; wherein, the chest wall brick 1 is built on each of the two sides of the forehearth, the cover plate brick 2 spans the top ends of the chest wall brick 1, and the thermal insulation layer 3 covers the outer surfaces of the cover plate brick 2 and the chest wall brick 1. The cover plate structure further comprises a first layer gap-covering brick 4, which is fixed between the cover plate brick 2 and the thermal insulation layer 3 and covers the gaps between adjacent cover plate bricks 2. Such arrangement of the first layer gap-covering brick 4 serves to separate the gaps between adjacent cover plate bricks 2 from the thermal insulation layer 3, so that the flame can be effectively prevented from rushing out through the gaps and from burning the thermal insulation layer 3, and thus the stability and service life of the cover plate structure for tank furnace forehearth are guaranteed.

To facilitate the construction work, in the embodiment of the present application, the top 42 of the first layer gap-covering brick 4 is aligned with the top 22 of the cover plate brick 2. As shown in FIG. 2, the section of the cover plate brick 2 is convex, and the section of the first layer gap-covering brick 4 is rectangular. The first layer gap-covering brick 4 is arranged on the tops of adjacent cover plate bricks 2 to cover the gap therebetween, so that the flame can be effectively prevented from rushing out.

It is to be noted that, in the embodiment of the present application, the cover plate brick 2 is a whole brick without any gaps along the span of the tank furnace forehearth. Hence, the gaps that need to be covered are those between adjacent cover plate bricks 2 along the length of the tank furnace forehearth.

Figure 3:
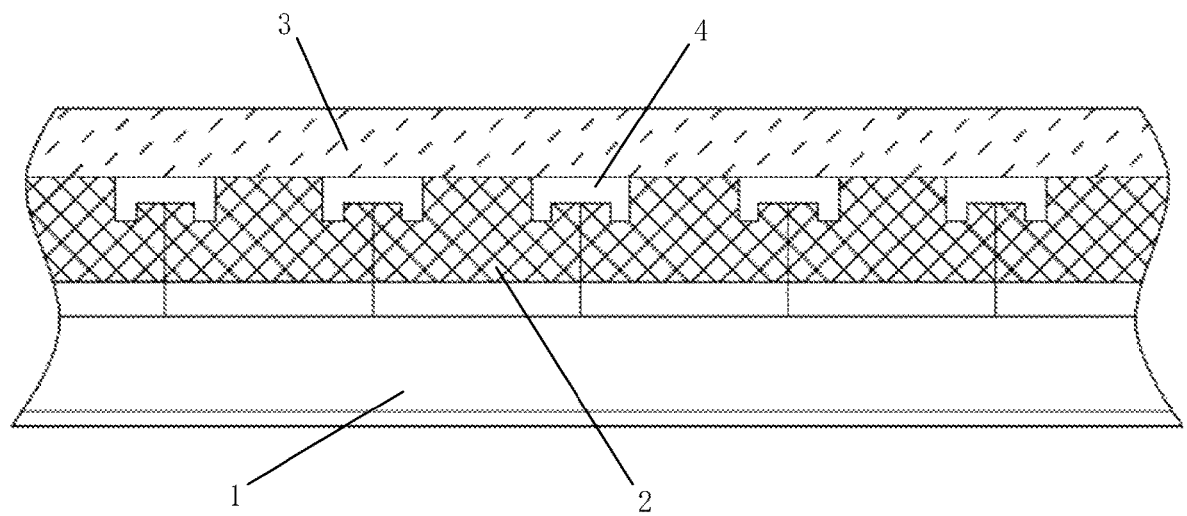
FIG. 3 is a side sectional view of another cover plate structure for glass fiber tank furnace forehearth according to the present application.
Figure 4:
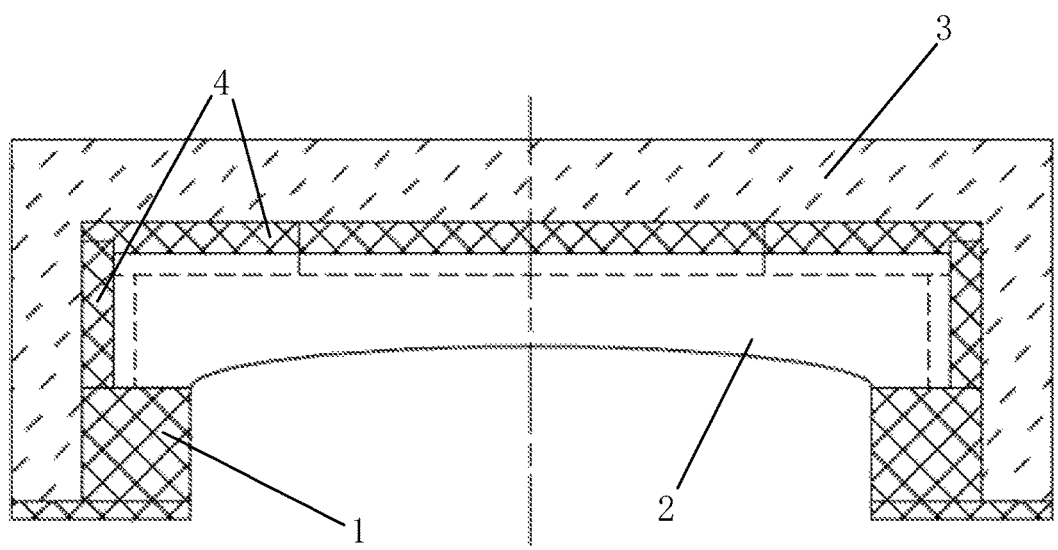
FIG. 4 is a schematic diagram of the cover plate structure for glass fiber tank furnace forehearth of FIG. 3.

FIG. 3 illustrates a side sectional view of a cover plate structure for glass fiber tank furnace forehearth in another embodiment of the present application. FIG. 4 illustrates a sectional view along the gap between adjacent cover plates in the cover plate structure for glass fiber tank furnace forehearth of FIG. 3. As shown in FIG. 3 and FIG. 4, in the present embodiment, the first layer gap-covering brick 4 not only covers the gap between adjacent cover plate bricks 2, but also fastens the adjacent cover plate bricks 2, so that the stability of the cover plate structure is further guaranteed.

Figure 5:
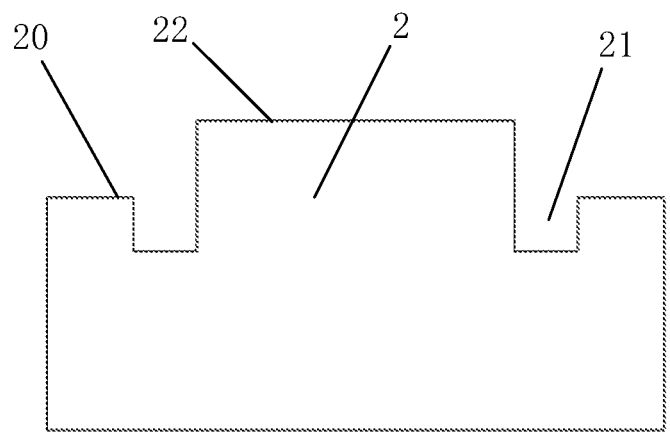
FIG. 5 is a schematic sectional view of a structure of the cover plate brick.
Figure 6:
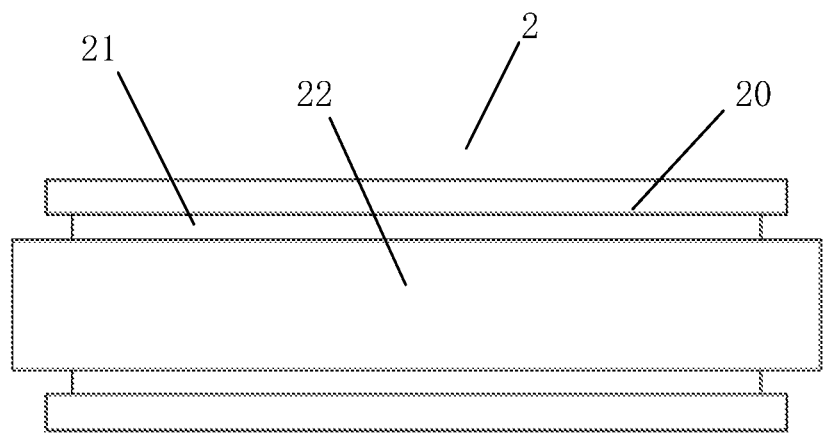
FIG. 6 is a schematic top view of the cover plate brick.
Figure 7:
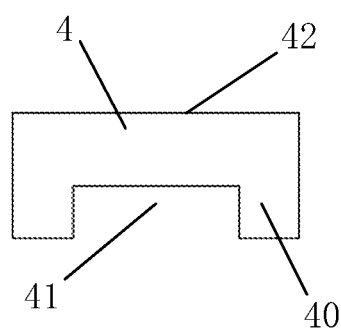
FIG. 7 is a schematic sectional view of a structure of the first layer gap-covering brick.

FIG. 5 shows a schematic sectional view of the cover plate brick 2 in the embodiment of the present application, FIG. 6 is a top view of the cover plate brick 2, and FIG. 7 is a schematic sectional view of the first layer gap-covering brick 4 in the embodiment of the present application. As shown in FIG. 3, FIG. 5, FIG. 6 and FIG. 7, a first groove 21 is arranged between the edge 20 and the top 22 of the cover plate brick 2, and correspondingly, a second groove 41 is arranged at the bottom of the first layer gap-covering brick 4. In installation, the side wall 40 of the first layer gap-covering brick 4 is embedded into the first groove 21.

To ensure the installation stability of the first layer gap-covering brick 4, the depth of the first groove 21 is greater than or equal to the depth of the second groove 41. Further, the height difference between the edge 20 and the top 22 of the cover plate brick 2 is greater than or equal to the difference between the thickness of the first layer gap-covering brick 4 and the depth of the second groove 41. Preferably, the height difference between the edge 20 and the top 22 of the cover plate brick 2 is equal to the difference between the thickness of the first layer gap-covering brick 4 and the depth of the second groove 41, so as to ensure that the top 42 of the first layer gap-covering brick 4 is aligned with the top 22 of the cover plate brick 2, and hence the installation stability as well as the good insulating effect of the thermal insulation layer 3 would be guaranteed.

Correspondingly, to facilitate the construction work, the thickness of the side wall 40 of the first layer gap-covering brick 4 is equal to or less than the width of the first groove 21, and the width of the second groove 41 is greater than or equal to twice the width of the edge 20 of the cover plate brick 2.

Specifically, the first layer gap-covering brick 4 covers not only the gap between the tops of adjacent cover plate bricks 2, but also the gaps at the sides of the cover plate bricks 2. Therefore, in the present embodiment, as shown in FIG. 6, the first groove 21 of the cover plate brick 2 extends to the two sides of the cover plate brick 2, that is, the side edges of the adjacent cover plate bricks 2 are also covered by the first layer gap-covering brick 4 containing the second groove 41.

In the two embodiments as depicted respectively in FIG. 1 and FIG. 4, the end of the first layer gap-covering brick 4 is flat, so the gap between adjacent first layer gap-covering bricks 4 may be in connection with the gap between adjacent cover plate bricks 2, and certain interconnected gaps may thus be present. To address this possibility, a number of solutions are provided in the present application.

Figure 8:
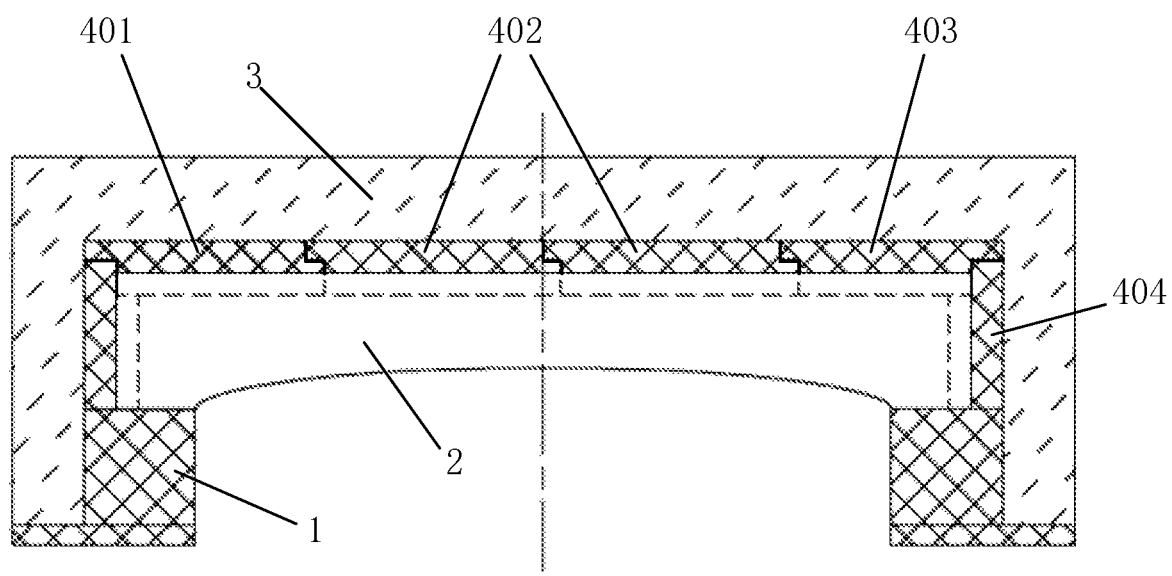
FIG. 8 is schematic diagram of another cover plate structure for glass fiber tank furnace forehearth according to the present application.

FIG. 8 shows a schematic diagram of a cover plate structure for glass fiber tank furnace forehearth in yet another embodiment of the present application. In this embodiment, the ends of the first layer gap-covering brick 4 are not all flat, but have the kind of structures that can match one another. Specifically, in the present embodiment, the first layer gap-covering brick 4 consists of a first gap-covering brick 401 at one end of the top of the cover plate brick 2, a number of a second gap-covering bricks 402 connected in sequence at the middle of the top of the cover plate brick 2, a third gap-covering brick 403 at the other end of the top of the cover plate brick 2, and a fourth gap-covering brick 404 at the sides of the cover plate brick 2; wherein, the two sides of the first, second and third gap-covering bricks 401, 402 and 403 respectively and the top of the fourth gap-covering brick 404 are all structurally matched with their respective adjoining surfaces and none of these sides or tops are flat, and specifically, neither of the two sides of the first, second and third gap-covering bricks 401, 402 and 403 respectively are vertically flat.

Figure 9:
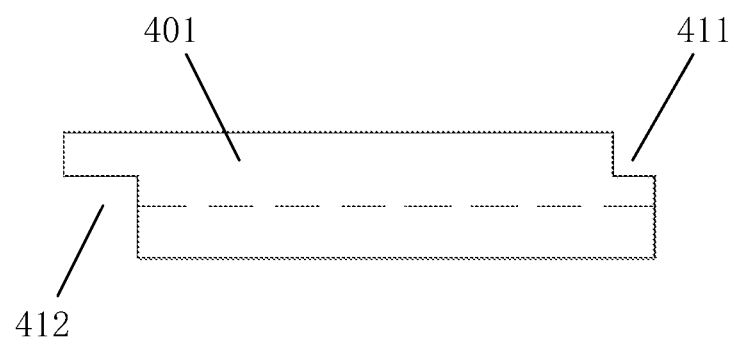
FIG. 9 is a schematic diagram of a specific structure of the first gap-covering brick.
Figure 10:
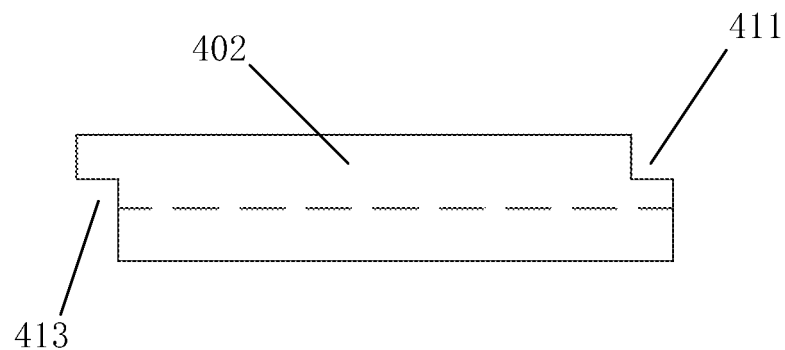
FIG. 10 is a schematic diagram of a specific structure of the second gap-covering brick.
Figure 11:
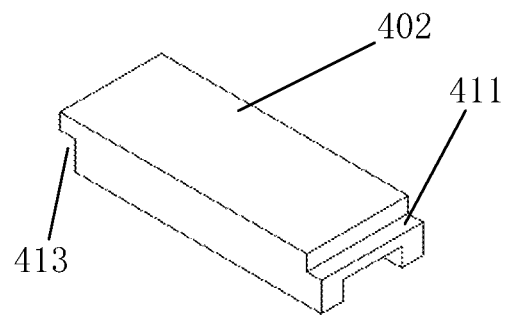
FIG. 11 is a perspective view of the second gap-covering brick.
Figure 12:
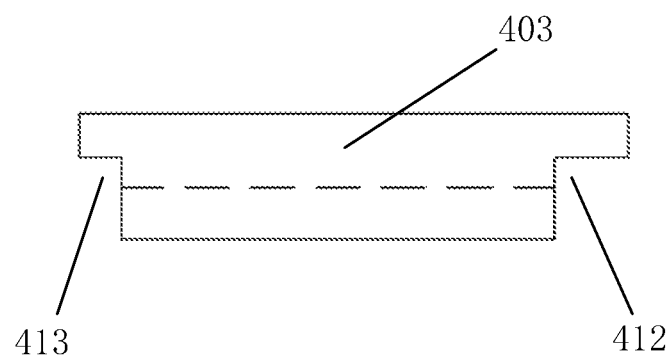
FIG. 12 is a schematic diagram of a specific structure of a third gap-covering brick.
Figure 13:
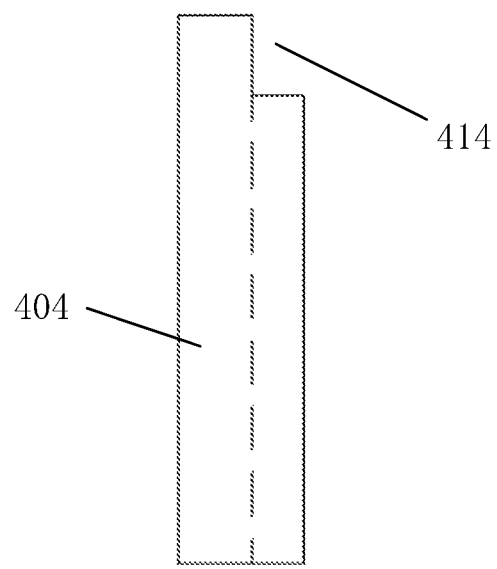
FIG. 13 is a schematic diagram of a specific structure of a fourth gap-covering brick.

FIG. 9 shows a schematic side view of the first gap-covering brick 401 in an exemplary embodiment of the present application, FIG. 10 shows a schematic side view of the second gap-covering brick 402 that structurally matches the first gap-covering brick 401, FIG. 11 is a perspective view of the second gap-covering brick 402 of FIG. 10, FIG. 12 is a schematic side view of the third gap-covering brick 403, and FIG. 13 is a schematic side view of the fourth gap-covering brick 404. As illustrated in these figures, in order to ensure the seamless connection of adjoining ends between adjacent gap-covering bricks, a first notch 411 is matched with a third notch 413, and a second notch 412 is matched with a fourth notch 414. The term "matched with" herein means that the two elements involved can form a rectangle when set against each other. Specifically, the width of the first notch 411 is equal to the width of the third notch 413, and the sum of the heights of the first notch 411 and the third notch 413 is equal to the thickness of the first layer gap-covering brick 4; and the height of the second notch 412 is equal to the height of the fourth notch 414, and the difference between the thickness of the fourth gap-covering brick 404 and the width of the fourth notch 414 is equal to the width of the second notch 412.

As shown in FIG. 8 to FIG. 13, the fourth notch 414 is arranged at the top of the fourth gap-covering brick 404, the second notch 412 is arranged at one end of the first gap-covering brick 401, and the first notch 411 is arranged at the other end of the first gap-covering brick 401; in this way, with the fourth notch 414 being matched with the second notch 412, a seamless connection between the top of the fourth gap-covering brick 404 and the first gap-covering brick 401 is achieved. The third notch 413 is arranged at one end of the second gap-covering brick 402, and the first notch 411 is arranged at the other end of the second gap-covering brick 402; in this way, with the third notch 413 being matched with the first notch 411, seamless connections between the first gap-covering brick 401 and the second gap-covering brick 402, and between the adjacent second gap-covering bricks 402, are achieved.

Correspondingly, the third notch 413 is arranged at one end of the third gap-covering brick 403, and the second notch 412 is arranged at the other end of the third gap-covering brick 403; and in this way, seamless connections between the second gap-covering brick 402 and the third gap-covering brick 403, and between the third gap-covering brick 403 and the top of the fourth gap-covering brick 404, are achieved. By utilizing the matching of the above structures of the gap-covering bricks 401, 402, 403 and 404, the gaps between adjacent cover plate bricks 2 can be fully and effectively covered and no gaps would be present that penetrate cover plate bricks 2 and get unimpededly to the thermal insulation layer 3. Hence, the flame can be prevented from rushing out of the tank furnace forehearth and burning through the thermal insulation layer; additionally, the stability of the cover plate structure can be guaranteed and its service life can be extended.

Specifically, the material of the first layer gap-covering brick 4 is the same as that of the cover plate brick 2. For example, the material can be resintered mullite, zircon or sintered AZS30.

Figure 14:
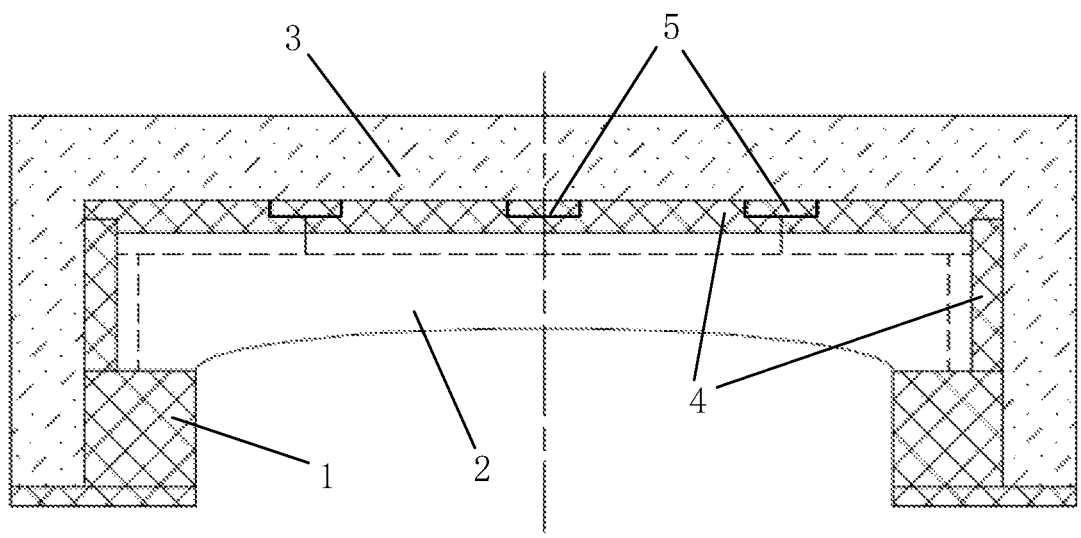
FIG. 14 is a schematic diagram of a further cover plate structure for glass fiber tank furnace forehearth according to the present application.

In addition, in order to avoid the possibility that the gap between the first layer gap-covering bricks 4 is connected to the gap between the cover plate bricks 2, a further embodiment of the present application is depicted in FIG. 14, where the cover plate structure further comprises a second layer gap-covering brick 5. The second layer gap-covering brick 5 is fixed between the first layer gap-covering brick 4 and the thermal insulation layer 3, and covers the gap between adjacent first layer gap-covering bricks 4. Specifically, a rectangular notch is arranged at the top of the first layer gap-covering brick 4. The thickness of the rectangular notch is equal to the thickness of the second layer gap-covering brick 5 and the width of the second layer gap-covering brick 5 is twice the width of the rectangular notch, so as to ensure that the second layer gap-covering brick 5 covers the gap between adjacent first layer gap-covering bricks 4, and ensure the installation stability of the second layer gap-covering brick 5. The length of the rectangular notch is greater than or equal to the length of the second layer gap-covering brick 5. For example, the rectangular notch may run through the whole width of the first layer gap-covering brick 4, and the length of the second layer gap-covering brick 5 may be greater than, equal to or less than the width of the first layer gap-covering brick 4.

Finally, it is to be noted that the material of the second layer gap-covering brick 5 is the same as that of the first layer gap-covering brick 4, that is, the material can be resintered mullite, zircon or sintered AZS30.

The contents described above can be implemented independently or in combination in various ways, and these transformations shall fall into the protection scope of the present application.

The specific dimension values of the components listed herein are exemplary numerical values, and dimension parameters of different components can have different numerical values as required by the glass fiber tank furnace in practical operations.

It is to be noted that, as used herein, the relational terms such as "first" and "second" are only used to distinguish one entity or operation from another, and do not necessarily require or imply any such actual relationship or order between these entities or operations. And the terms "comprise/comprising," "contain/containing" or any other variants thereof is non-exclusive, so that an object or a device containing a series of elements contains not only these elements, but also other elements not listed clearly, or further contains inherent elements of the object or device. Unless otherwise defined herein, an element defined by the statement "comprises/comprising an/a . . ." does not exclude other identical elements in the object or device including this element.

The foregoing embodiments are merely used for describing the technical solutions of the present application and not intended to constitute any limitations thereto, and the present application has been described in detail just by preferred embodiments. It should be understood by a person of ordinary skill in the art that modifications or equivalent replacements can be made to the technical features of the present application without departing from the spirit and scope of the technical solutions of the present application, and these modifications or equivalent replacements shall fall into the scope defined by the appended claims of the present application.

INDUSTRIAL APPLICABILITY

The present application improves on the edge structure of the cover plate brick and arranges a gap-covering brick at the gap between adjacent cover plate bricks so as to cover the gap, so that the flame inside the glass fiber tank furnace forehearth can be effectively prevented from rushing out through the gap. At the same time, the gap-covering brick is structurally matched with the cover plate brick to ensure connection stability of the adjacent cover plate bricks, and thus the stability and service life of the cover plate structure for tank furnace forehearth is guaranteed.

The invention claimed is:

1. A cover plate structure for a glass fiber tank furnace forehearth comprising:
    chest wall bricks at two sides of the forehearth;
    cover plate bricks each spanning between a top end of at least one of the chest wall bricks at one of the two sides of the forehearth and a top end of at least one of the chest wall bricks at another one of the two sides of the forehearth;
    a thermal insulation layer covering outer surfaces of the cover plate bricks and the chest wall bricks; and
    a gap-covering brick fixed between the cover plate bricks and the thermal insulation layer and covering a gap between adjacent ones of the cover plate bricks;
    wherein:
        one cover plate brick of the cover plate bricks includes a first groove between an edge and a top of the one cover plate brick;
        the gap-covering brick includes a second groove at a bottom of the gap-covering brick;
        a side wall of the gap-covering brick is embedded in the first groove; and
        a height difference between the edge and the top of the one cover plate brick is greater than or equal to a difference between a thickness of the gap-covering brick and a depth of the second groove.

2. The cover plate structure according to claim 1, wherein a top of the gap-covering brick is aligned with a top of the cover plate bricks.

3. The cover plate structure according to claim 1, wherein a depth of the first groove is greater than or equal to the depth of the second groove.

4. The cover plate structure according to claim 1, wherein a thickness of the side wall of the gap-covering brick is equal to or less than a width of the first groove, and a width of the second groove is greater than or equal to twice a width of the edge of the one cover plate brick.

5. The cover plate structure according to claim 1, wherein a material of the gap-covering brick is same as a material of the cover plate bricks.

6. The cover plate structure according to claim 5, wherein the material of the gap-covering brick and the material of the cover plate bricks include at least one of resintered mullite, zircon, or sintered AZS30.

7. The cover plate structure according to claim 1,
    wherein the gap-covering brick is one of a plurality of first gap-covering bricks fixed between the cover plate bricks and the thermal insulation layer and each covering a gap between two adjacent ones of the cover plate bricks;
    the cover plate structure further comprising:
        a second gap-covering brick fixed between the first gap-covering bricks and the thermal insulation layer and covering a gap between adjacent ones of the first gap- covering bricks.

* * * * *